(12) United States Patent
Saunders

(10) Patent No.: US 6,697,850 B1
(45) Date of Patent: Feb. 24, 2004

(54) SATELLITE-BASED COMMUNICATIONS SYSTEM HAVING AN ON-BOARD INTERNET WEB PROXY CACHE

(75) Inventor: Oliver W. Saunders, Los Angeles, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/567,853

(22) Filed: May 9, 2000

(51) Int. Cl.[7] .............................................. G06F 15/16
(52) U.S. Cl. ...................................... 709/219; 703/217
(58) Field of Search ................................ 709/219, 231, 709/200, 217; 370/464

(56) References Cited

U.S. PATENT DOCUMENTS

| | | | | |
|---|---|---|---|---|
| 5,841,398 A | * | 11/1998 | Brock | 342/357.02 |
| 6,018,764 A | * | 1/2000 | Field et al. | 709/217 |
| 6,105,060 A | * | 8/2000 | Rothblatt | 709/219 |
| 6,141,333 A | * | 10/2000 | Chavez, Jr. | 370/338 |
| 6,243,560 B1 | * | 6/2001 | Jenkin | 455/12.1 |
| 6,324,182 B1 | * | 11/2001 | Burns et al. | 370/429 |
| 6,385,647 B1 | * | 5/2002 | Willis et al. | 709/217 |
| 6,415,368 B1 | * | 7/2002 | Glance et al. | 711/158 |
| 6,529,477 B1 | * | 3/2003 | Toporek et al. | 370/235 |
| 6,529,706 B1 | * | 3/2003 | Mitchell | 455/12.1 |
| 2002/0009060 A1 | * | 1/2002 | Gross | 370/321 |
| 2002/0010761 A1 | * | 1/2002 | Carneal et al. | 709/219 |
| 2002/0073219 A1 | * | 6/2002 | Kikinis | 709/231 |

OTHER PUBLICATIONS

Henderson et al., "Transport Protocols for Internett–Compatible Satellite Networks", IEEE, vol. 17, No. 2, Feb. 1999, pp. 326–344.*

Golding S. Leonard, "Satellite Communications Systems Move Into the twenty–First Century", Wireless Networks 4, (1998), pp. 101–107.*

Kota et al., Reservation Access Protocol For Multiplanar ATM Switched Satellite Network (MASSNet), IEEE, 0–7803–1828–5/9 pp. 1048–1052.*

* cited by examiner

Primary Examiner—Krisna Lim

(57) ABSTRACT

A method and system for communicating internet data in a satellite-based communications system. A request for a selected web page is transmitted from either a standard terminal or an enhanced terminal to the satellite. The satellite initially determines whether the transmission came from a standard user or an enhanced terminal. If the request was from a standard terminal, the satellite relays the request for the web page directly to the ground station, which retrieves the requested web page from a local cache or the internet, and transmits the requested web page to the satellite, where the satellite in turn retransmits it to the user terminal. If the original request was transmitted from an enhanced terminal, then the satellite determines whether or not it already has a copy of the requested web page in its on-board memory cache. If the satellite has a copy in its memory cache, the requested web page is retrieved from its memory cache and transmitted to the enhanced terminal. If the satellite does not have a copy of the requested web page, it requests the page from the ground station if the same fashion as with the standard terminal.

11 Claims, 4 Drawing Sheets

SATELLITE-BASED COMMUNICATIONS SYSTEM HAVING AN ON-BOARD INTERNET WEB PROXY CACHE

BACKGROUND OF THE INVENTION

This invention relates generally to a communications system, and more particularly to a satellite-based communications systems where the satellite includes an on-board cache for Internet web information.

Access to an internet is imperative for most computer users today. Public and private internets provide an especially convenient means for exchanging information.

Internet users can quickly transmit data to others internet-connected sites, as well as research various subjects by downloading a variety of materials, such as text, graphics, and executable programs.

Although the term "internet" is usually associated with the global and public Internet, there are both public and private internets. Private internets, often called "intranets" or "enterprise internets," often have access limited to employees of a particular company. An internet is an open interconnection of networks, supporting the exchange of information among various attached computers. An internet includes a network of routing computers, which receive access requests and cooperatively route the requests to appropriate host computers capable of executing the request. Advantageously, routing computers and hosts may use almost any different type of architecture and operating system. Within an internet, communications are typically conducted under a standard protocol, such as Transmission Control Protocol/Internet Protocol ("TCP/IP"). Internets may employ a variety of electronic transport media, such as telephone lines, optical fiber, satellite systems, local area networks, etc. Users can access internets by a number of different means. In one example, a user's computer connects to a host computer directly via telephone line, cable television line, ISDN line, or another line, the host computer itself being coupled to internet routers by a T3 connection or other suitably fast link. In another example, a user's computer may be coupled to a network, such as a local area network, which connects to an internet by an appropriate means, such as a T3 connection.

Although the depth of information available through internets is nearly unlimited, there are definitely limits to internet access speed. Even the fastest internet access links can only carry so much data in a given period of time. Due to the limited communications bandwidth of internet access links, internet users may confront a number of different penalties. For example, users with local network connection to an internet may experience slow download times because of the local network's internet workload from other users. In this case, since the network server operates as a conduit to the internet, it may be burdened by many different simultaneous user requests to download information from the internet. In a corporate intranet environment, users can suffer from slow network performance despite whether their particular download request is urgent or not. For example, one user with a particularly urgent request to download critical accounting information may be delayed because of many other users busy obtaining weather information, checking stock prices, idly "surfing the net," and doing other less urgent tasks. Especially frustrating is the fact that burdensome internet access tasks can prevent the network server from efficiently completing other processing tasks, completely unrelated to internet access.

For instance, a large number of concurrent internet communication requests may slow the network server's completion of spreadsheet programs, personal calendars, mathematical computations and modeling, and other programs running on the network on behalf of individual users. On the other hand, users that individually connect to the internet can avoid many of the problems experienced with internet access through local networks. Nonetheless, users with individual internet connect on still encounter different problems of their own. If the user's internet link is a telephone line, for example, long downloads may result in higher charges from the telephone company, and longer periods during which a shared telephone line is unavailable for other purposes, such as voice calls and fax use. Consequently, known approaches to internet access are not completely adequate for some applications due to certain unsolved problems.

One potential scheme utilized to minimize the problem has involved the use of a server to selectively filter and cache internet access requests from the terminals attached to the server, and subsequently resubmit the cached requests appropriately. Web caches bring two main benefits to an Internet Service Provider (ISP): improved response times and more efficient use of bandwidth. Deploying a cache significantly reduces the "world wide wait" problem-by storing Web objects closer to end users. If the requested objects are in the cache, they get the information almost instantaneously, while requests that have to go to the remote web server typically take several seconds to be fulfilled.

Second, caches reduce traffic and ultimately save ISPs money by decreasing their bandwidth costs by as much as 50 percent. When users get objects from caches, they do not use as much bandwidth as if the object came from the origin server. This is of high importance to ISPs as they grow their business and expand their customer base.

An illustration of this system is presented in FIG. 1. The internet 12 in this context may be the worldwide public Internet, or a private. "enterprise" internet such as a corporate "intranet." Since the browsers or terminals 14 are connected to the internet via the server 16, the server 16 is a focal point for all internet requests. Initially, the server 16 receives a request from one of the attached terminals 14 to download desired information from the internet 12. The received request contains a download code, such as a universal resource locator ("URL"), identifying the desired information page 18. The server 16 determines whether the requested page 18 has previously been cached within the server 16. If it has, the server 16 does not forward the request to the internet 12, but instead replies directly to the terminal 14 with the copy 20 of the requested page 18. If the cache 22 within the server 16 does not contain a copy 20 of the requested page 18, the server 16 forwards the request to the internet 12, which then routes the request through remote we servers 24 to obtain the page 18. The page 18 is then obtained from the web servers 24, and transmitted through the internet 12 to the server 16 and thence to the requesting browser 14.

The extent of the benefits of caching are directly related to the "hit rate" that the cache experiences. The "hit rate" (requested content in cache divided by total requested content) is the primary driver both for improvements in average response time and for bandwidth savings. Hits are served instantaneously and do not consume bandwidth back to the origin server. Misses, on the other hand, take several seconds to be served and consume bandwidth. A well designed cache achieves hit rates of 30 to 60 percent of Web traffic, depending on size and diversity of the end user community, the size of the cache and the caching algorithms used. For certain types of requests, traffic hit rates can reach 90 percent.

With the advent of satellite-based communications systems, such as that being contemplated under names Astrolink™, Teledesic™, Spaceway™, and the like where internet traffic is transmitted wirelessly through space to and from the satellites to the distant ground stations and internet servers, the space transmission time delays alone associated with fetching a web page can amount to as much as 480 milliseconds. This makes the system appear to be slow and sluggish independent of available transmission speeds. Furthermore, since each request requires the use of four links, the bandwidth usage associated with each request is high.

What therefore would be desirable would be to provide a satellite-based communications systems where the delays and bandwidth usage are minimized.

SUMMARY OF THE INVENTION

The aforementioned need experienced in the prior art is met by the present invention, which provides a method for communicating internet data in a satellite-based communications system of the type including a satellite having a memory cache containing selected web pages, a standard user terminal 32 capable of receiving only one type of data transmission, an enhanced terminal 34 capable of receiving at least two types of data transmissions, and a ground station interconnected with the internet. The method functions by transmitting a request for a selected web page from either the standard user terminal 32 or the enhanced terminal 34 to the satellite. The satellite determines if the transmission came from a standard user or an enhanced terminal 34. If the request was transmitted from a standard user terminal 32, then the satellite relays the request for the webpage directly to the ground station. The ground station then retrieves the requested web page from the internet, and then transmits the requested web page to the satellite, where the satellite in turn takes the transmission and retransmits it to the user terminal 32. If the original request was transmitted from an enhanced terminal 34, then the satellite determines whether or not it already has a copy of the requested web page in its memory cache. If the satellite has a copy of the requested web page in its memory cache, the satellite processor retrieves the requested web page from its memory cache and transmits the web page to the enhanced terminal 34. If the satellite does not have a copy of the requested web page, it in turn requests the web page from the ground station, which then obtains the page from the internet, transmits it to the satellite, and the satellite in turn retransmits the requested web page to the enhanced terminal 34.

BRIEF DESCRIPTION OF THE DRAWINGS

Reference is now made to the Description of the Preferred Embodiments, illustrated in the accompanying drawings, in which.

DESCRIPTION OF THE PREFERRED EMBODIMENTS

Figure 4:
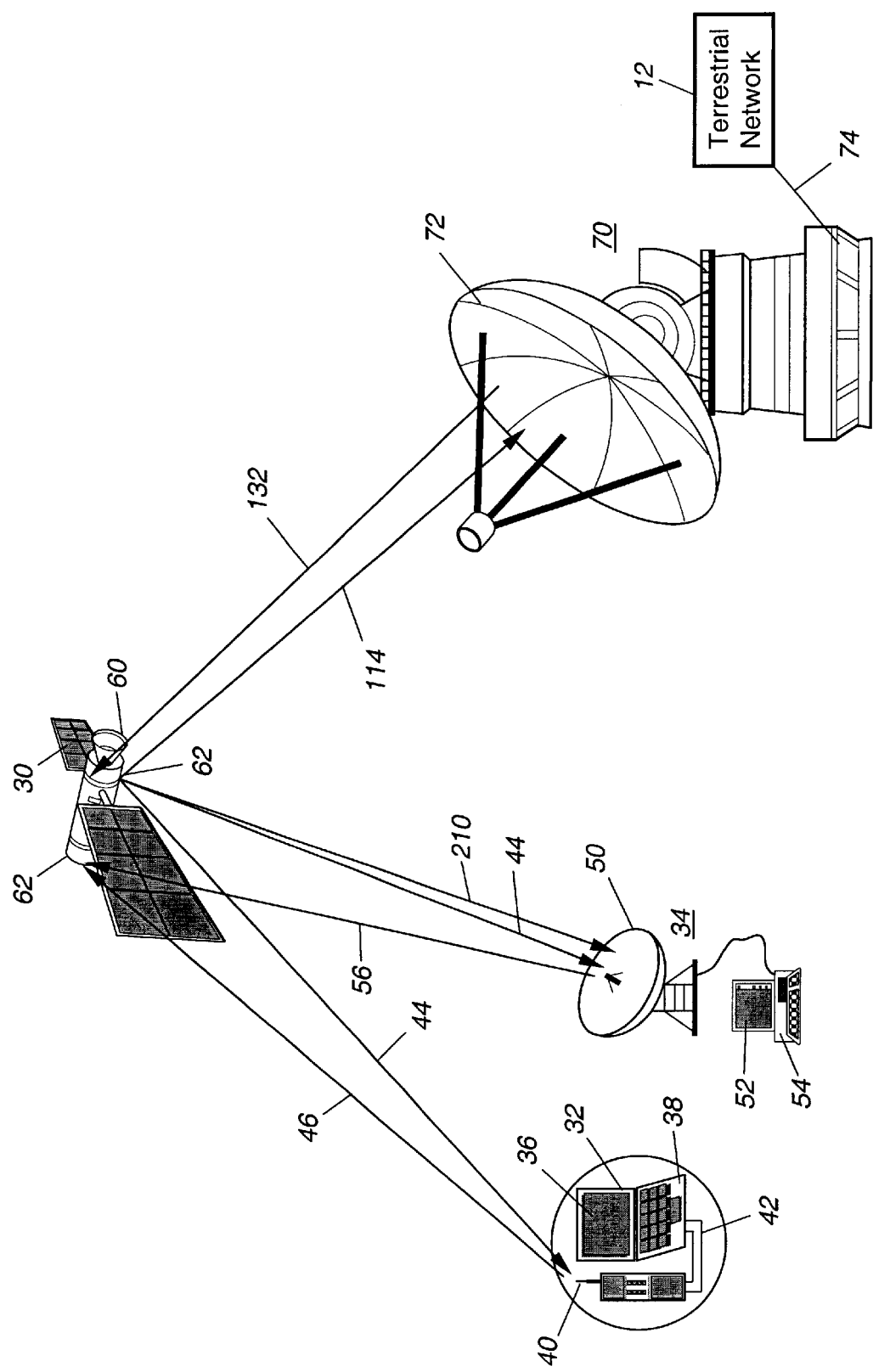
FIG. 4 is a schematic illustration of the various hardware elements present in the system of the invention, further illustrating the various transmission links that may be utilized.

Referring now more particularly to FIG. 4, the communications system includes a satellite 30 located in space over the earth, preferably in geosynchronous or geostationary orbit although satellites in low earth orbits or medium earth orbits would function in the system. Two different types of ground terminals for internet browsers are included. The first, a standard user terminal. 32, is made of the monitor 36, a processor 38, and an antenna 40. Though illustrated as basically a laptop computer, the standard user terminal 32 can be any device, such as an internet-ready cellular phone, that can communicate and display web pages 18. The monitor 36, is used for displaying web pages 18 so that they can be perceived by a user. The processor 38 can be a commercial microprocessor such as are found in typical computers. The processor 38 provides at least two functions: it accepts data from the antenna 40 and translates the received RF data into web pages 18 for display on the monitor 36; and it accepts user requests such as may be entered via the keyboard 42 and generates a system request for data concerning the requested web pages 18 that can be formatted and transferred to the antenna 40 for transmission to the satellite 30.

The standard user terminal 32 is designed so that it can only receive one type of data stream 44 from the satellite 30. The user terminal 32 communicates with the satellite 30 through the uplink 46 and the downlink 44. The uplink 46 is used to transfer RF data from the user terminal 32 to the satellite 30, and would generally be encoded and modulated. While Code Division Multiple Access (CDMA) or Time Division Multiple Access (TDMA) protocols are envisioned, any appropriate protocol may be used, and the system is not limited to a particular protocol.

The enhanced terminal 34, similar to the standard user terminal 32, contains an antenna 50, monitor 52 and a processor 54, which function is a manner as heretofore described with respect to the standard user terminal 32. However, the enhanced terminal 34 is capable of receiving multiple streams of RF data. In particular, the enhanced terminal 34 is capable of receiving RF data streams that are generated by the satellite payload 60, or that are originated elsewhere and only relayed through the satellite 30. The standard user terminal 32, contrastingly, is only capable of receiving the data stream 44 that is originated elsewhere and only relayed through the satellite 30.

The satellite 30 contains a plurality of antenna 62, a memory storage device 64 (see FIG. 2), and a processor 66. The antenna 62 enable RF data communications to occur between the terminals 32, 34 and the satellite 30, and between the ground station 70 and the satellite 30. The memory storage device 64, which typically would be a solid state recorded suitable for satellite applications, functions as a memory cache and contains data for a plurality of web pages 18. The processor 66 functions to demodulate the data streams coming on the uplinks 46, 56, and determines whether or not to transfer the request for the selected web pages 18 to the internet 12, as will be explained hereinafter in greater detail.

The ground station 70 also has an antenna 72 which enables it to communicate with the satellite 30. The ground station 70 provides a hub-based access to the terrestrial internet 12, through the link 74.

Although a particular system architecture has been described, the invention disclosed herein is capable of being utilized with any satellite 30 system architecture which has a hub-based access to the terrestrial internet, on-board demodulation of uplink traffic from the users to the hub, and user terminal 32 with the capability to receive downlink traffic that is both relayed through and generated by the satellite 30 payload.

Figure 2:
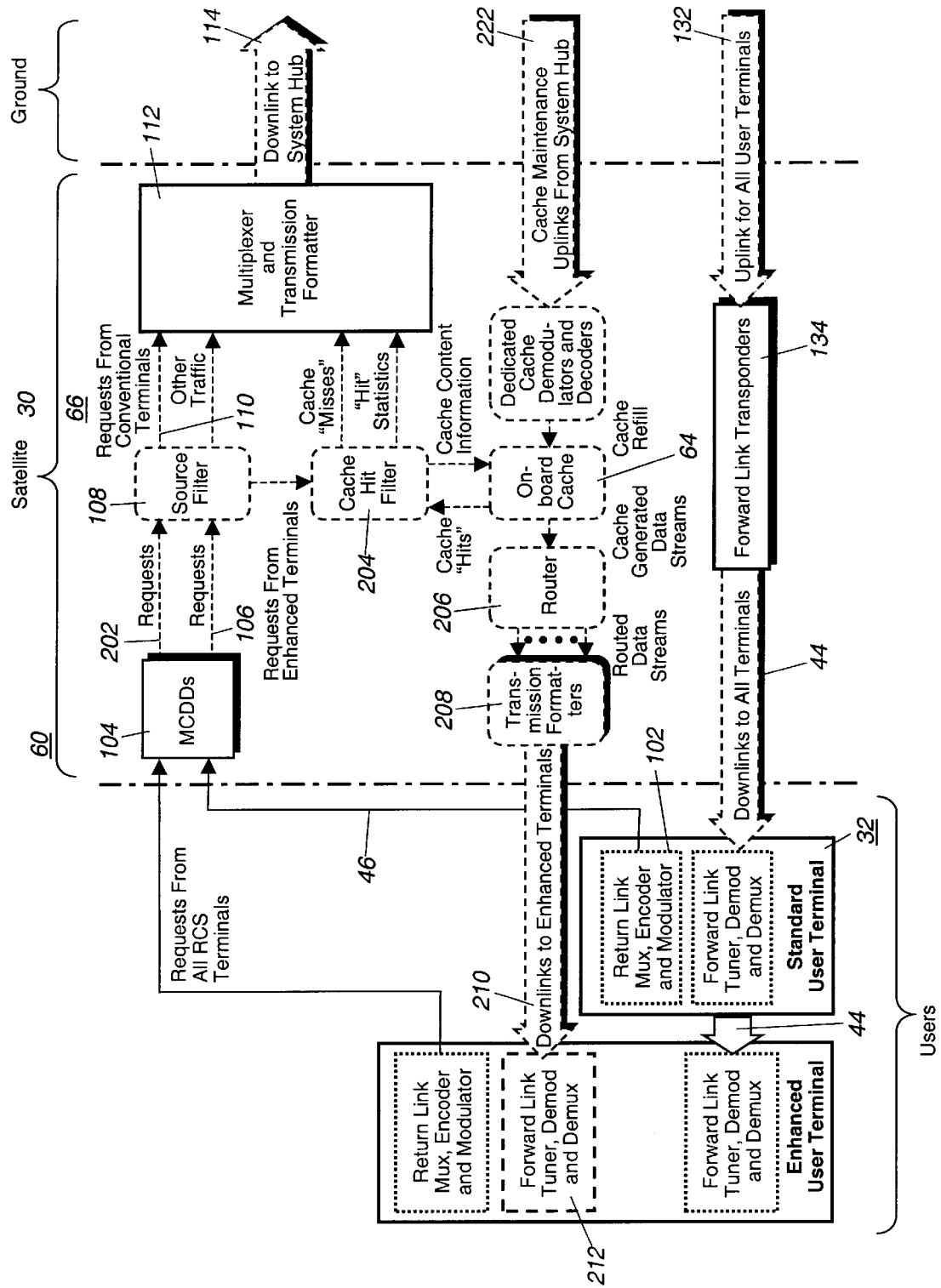
FIG. 2 is a block diagram of the various flow elements attendant to operating the satellite-based caching system of the present invention.
Figure 3:
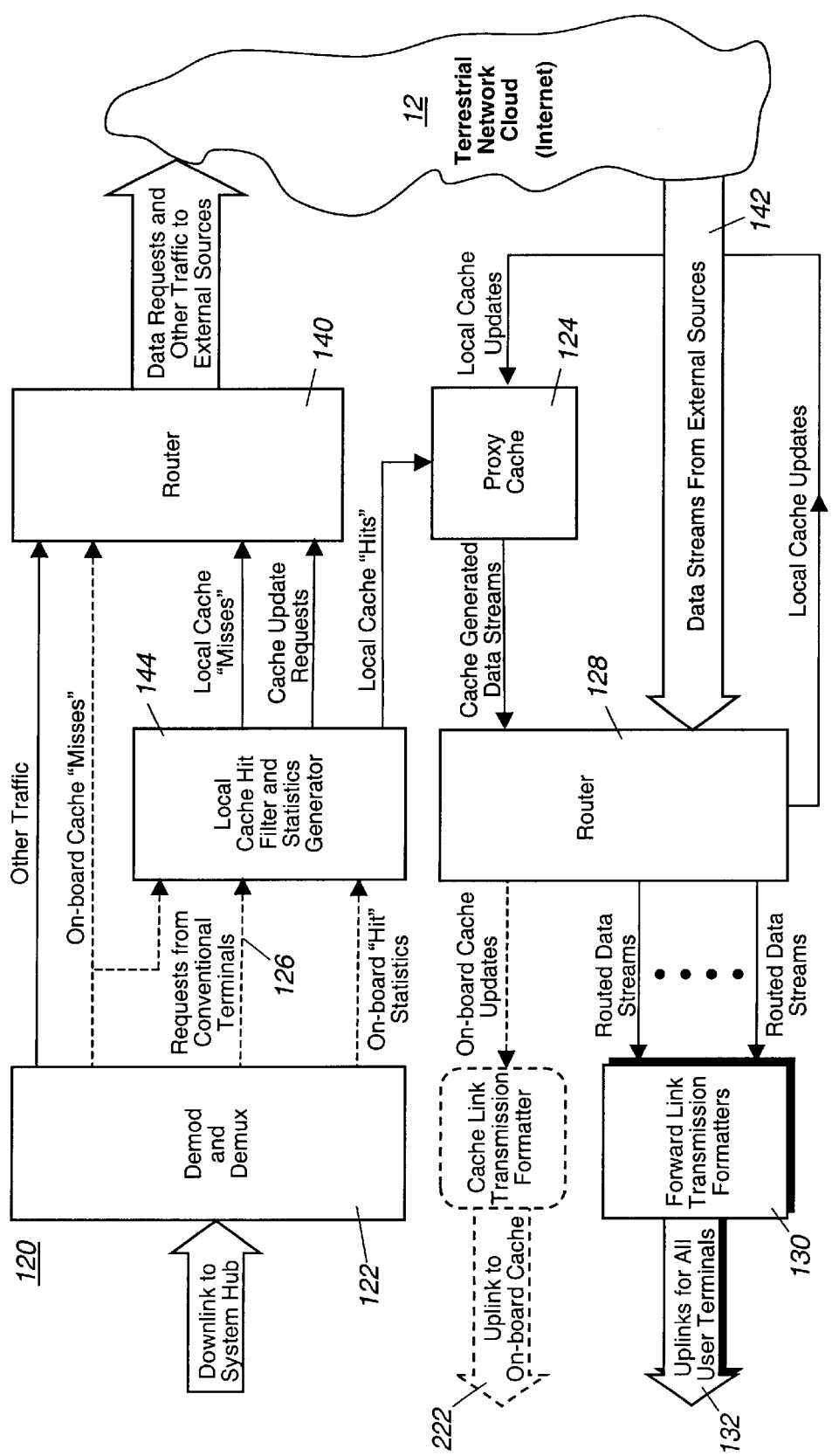
FIG. 3 is a block diagram of the various flow elements located on the ground in the satellite-based system of the present invention.

Referring now more particularly to FIGS. 2 and 3, therein is illustrated the flow of data and requests as the system operates. FIG. 3 illustrates only the ground station portion of the system, while FIG. 2 illustrates both ground and satellite processes.

Assume initially that the user desiring a web page 18 is one with a standard user terminal 32. The user inputs a request for a web page 18 through the keyboard 42, which in turn is processed by the microprocessor 38 so as to generate a request for the web page 18. The terminal 32 multiplexes, encodes, and modulates this request 102, and transmits it through the antenna 40 to the satellite antenna 62 by way of the uplink 46. The satellite antenna 62 receives the request, and sends it to the multi-channel demodulator/decoder 104, where the transmission packet is demodulated and decoded in a conventional fashion. The decoded data stream 106 is then transferred to the source filter 108, which separates web page requests from system administrative traffic, and further separates requests between those generated by the standard user terminal 32 from those generated by the enhanced terminal 34. All traffic that does not contain web page requests from enhanced terminals 34, such as that in the instant example, is sent directly 110 to the multiplexer & transmission formatter 112, where the request is multiplexed with additional data about user requests and formatted for transmission. From the multiplexer & transmission formatter 112, the data stream is transferred to another satellite antenna 62, and transmitted through the downlink 114 to the ground station hub 70.

Figure 1:
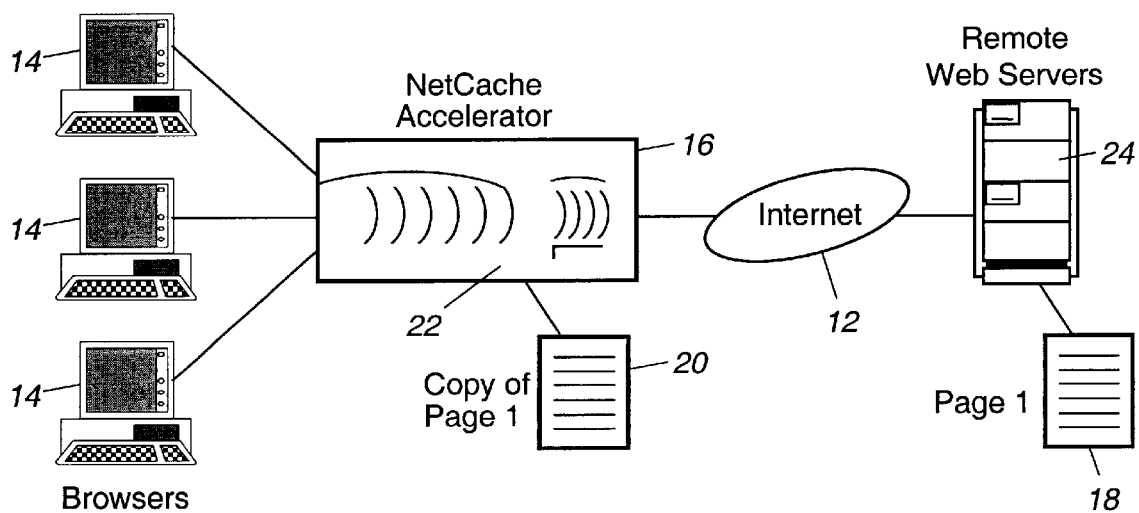
FIG. 1 is an illustration of a terrestrial web caching system present in the prior art.

At the ground station 70, the data stream is received by the antenna 72, sent to the processor 120, and the stream is demodulated and demultiplexed 122. From there, the original request is transferred 126 to the local memory cache 124, which like the prior art system described with respect to FIG. 1, contains copies of selected pages 18 that are most frequently requested. As described before, if the local cache 124 contains the requested page 18, it is transmitted to the router 128 and thence to the forward link transmission formatter 130, where the information is modulated for its transmission on the uplink 132 to the satellite 30. The data flows from the ground station 70 through the uplink 132 to the satellite 30, through the satellite forward link transponders 134 and through the downlink 44 to the standard user terminal 32.

If the local cache 124 does not contain the requested page 18, the request is sent through the router 140 to the internet 12, where the page is obtained from the host server 24 (see FIG. 1) for the page 18. The data stream from the server 24 flows 142 to the uplink router 128, and then the path being followed is the same as that described above with respect to the local cache 124 having the requested page 18.

The local cache 124 contains a hit filter and statistics generator 144, which tracks the frequency of requests for individual web pages, and updates the local proxy cache 124 with information from the internet 12 as a function of the necessity to keep the most requested pages in the proxy cache 124. The most popular, most frequently requested, pages are placed in the caches in the order of their popularity until the caches 124 are filled.

Assume now that the request for a web page 18 is made by a user with an enhanced terminal 34. The request, as before, goes to the multi-channel demodulator/decoder 104 for demodulation and decoding. The decoded data stream is transferred 202 to the source filter 108, which determines that this is a request for a web page 18 from an enhanced terminal 34. In this instance, the request is transferred to the cache hit filter 204, which then determines whether or not the requested web page 18 is present within the on-board memory storage cache 64. If it is, then the requested web page 18 is removed from the on-board cache 64, sent to the router 206 and transmission formatter 208 for modulation and coding, and sent through the antenna 62 onto the enhanced terminal downlink 210 to the enhanced terminal 34. At the terminal 34, the data stream on the downlink 210 is demodulated, decoded 212, and transferred to the processor 54, which in turn processes the data into a format suitable for viewing on the display monitor 52.

It should be noted that the downlink 210 from the satellite 30 to the enhanced terminal 34 is different from the downlink 44 that comes from the ground station 70 through the satellite 30, 134 to the standard 32 or enhanced terminal 34. The downlink data stream 210 in this instance is generated by the on-board payload 60, and may differ from the other downlink in frequency, polarization, timing, or other similar factors.

If the cache hit filter 204 determines that the requested web page 18 is not present in the memory storage cache 64, then the request is transferred to the multiplexer and transmission formatter 112, and is processed as heretofore described with respect to requests from standard user terminals 32. It should be noted that when the requested web page 18 is routed through the "bent pipe" satellite 30 to the enhanced terminal 34, in this case the downlink 44 is the same as the downlink 44 to the standard user terminal 32 and not the downlink 210 that carries data streams generated from the satellite on-board payload 60.

The contents of the on-board cache 64, similar to the ground station cache 124, are established through statistical analysis of all web page requests flowing through the satellite 30. The on-board cache 64 may be identical to, or a subset of, the ground station cache 124, depending on system resources available. The on-board cache hit filter 204 keeps statistics on on-board hits, and reports them to the ground station statistics generator 144 on a regular basis.

Also on a regular or periodic basis, the system updates the contents of the caches 64, 124, replacing less often accessed web pages with those that are more in demand. The contents of the caches 64, 124 are obtained directly from the web page servers 24 over the terrestrial network 12. A dedicated transmission link 222 is provided between the ground station 70 and the on-board cache 64 to reduce the length of time required to initially fill and then refresh the cache 64 when needed. The required capacity for this link 222 is determined by the rate at which the contents of the cache 64 are expected to change.

In addition to updating the cache 64 in response to user request patterns, web pages 18 containing timely information, such as news headlines, sports scores and so forth, must be periodically refreshed in the caches. Updated pages obtained from their respective sources are uploaded from the internet 12 through the ground station 70 and over the dedicated uplink 222 to the cache 64, overwriting the stale pages.

Thus it can be seen that the present invention provides numerous advantages in solving the need existing in the prior art. The system described substantially reduces the delay in accessing popular web pages, and make the overall system more responsive to end users of satellite based internet services. It further increases the system's capacity by reducing the uplink bandwidth needed to transmit these pages from the hub to the satellite. This occurs because, independent of the number of times that a cached web page is transmitted to users in response to user requests, it need be transmitted to the satellite only once. This additional uplink bandwidth can be used to support more users than would be possible in a prior art, non-cached payload.

I claim as my invention:

1. A method for communicating Internet data in a satellite-based communications system comprising:

transmitting a request for a selected web page from a ground terminal to a satellite;

determining, on the satellite, whether the satellite already has a copy of the requested web page in satellite-located memory;

if the satellite has a copy of the requested web page in satellite-located memory, retrieving the requested web page from satellite-located memory and transmitting the web page from the satellite to the ground terminal; and if the satellite does not have a copy of the requested web page, requesting, by the satellite, the web page from a ground station interconnected with the Internet, receiving the requested web page from the ground station, and transmitting the requested web page to the ground terminal.

2. The method according to claim 1, including transmitting on a first link web pages retrieved from satellite-located memory, and transmitting on a second link web pages obtained as a result of a satellite to ground station request.

3. The method according to claim 1 further comprising tracking on said satellite the frequency of requests for individual web pages, and periodically requesting from said ground station those web pages having the highest frequency of requests.

4. The method according to claim 3 further comprising storing those web pages having the highest frequency of requests in said satellite-located memory.

5. The method according to claim 1 further including periodically refreshing the web pages stored in the satellite-located memory.

6. A method for communicating internet data in a satellite-based communications system comprising:

transmitting a request for a selected web page from a ground terminal to a satellite;

determining, on the satellite, whether the satellite already has a copy of the requested web page in satellite-located memory;

if the satellite has a copy of the requested web page in satellite-located memory, retrieving the requested web page from satellite-located memory and transmitting the web page from the satellite to the around terminal if the satellite does not have a copy of the requested web page, requesting, by the satellite, the web page from a ground station interconnected with the Internet, receiving the requested web page from the around station, and transmitting the requested web page to the ground terminal;

transmitting on a first link web pages retrieved from satellite-located memory, and transmitting on a second link web pages obtained as a result of a satellite to ground station request; and determining at said satellite the capability of said ground terminal to receive web pages on both said first and second links, and if the ground terminal lacks the capability to receive on both links, then requesting web pages from the ground station notwithstanding the existence of the requested web page in satellite-located memory.

7. A method for communicating Internet data in a satellite-based communications system of the type Including a satellite having a memory cache therein containing selected web pages, a user terminal capable of receiving one type of data transmission, an enhanced terminal capable of receiving at least two types of data transmissions, and a ground station interconnected with the Internet, said method comprising:

transmitting a request for a selected web page from one of said user terminal and said enhanced terminal to said satellite;

determining, on the satellite, the type of terminal from which the request was transmitted;

in the event the request was transmitted from an enhanced terminal, then:

determining whether the satellite already has a copy of the requested web page in the memory cache; then if the satellite has a copy of the requested web page in the memory cache, retrieving the requested web page from the memory cache and transmitting the web page from the satellite to the enhanced terminal; and if the satellite does not have a copy of the requested web page, requesting the web page from the ground station, receiving the requested web page from the ground station, and transmitting the requested web page to the enhanced terminal; and in the event the request was transmitted from a user terminal, then requesting the web page from the ground station, receiving the requested web page from the ground station, and transmitting the requested web page to the user terminal.

8. The method according to claim 7 further including periodically refreshing the web pages stored in the memory cache.

9. The method according to claim 7 further including tracking the frequency of requests for individual web pages, periodically requesting from the ground station those web pages requested the most frequently, and storing those most frequently requested web pages in the memory cache.

10. A satellite-based communications system comprising:

a satellite located in space including a first processor and a memory storage device therein, said memory storage device containing data concerning the content of a plurality of Internet web pages, said satellite further including antenna means for transmitting first and second streams of RF data and receiving RF data;

an enhanced terminal located on earth and comprising:

an enhanced terminal monitor for displaying web pages;

enhanced terminal receiving means for receiving RF data from said satellite antenna, said enhanced terminal receiving means capable of receiving first and second RF data streams from said satellite antenna means;

enhanced terminal processing means for translating said received RF data into web pages for display on said enhanced terminal monitor;

enhanced terminal request generation means for requesting data to enable the display of selected web pages; and enhanced terminal transmission means for transmitting said requests for data to said satellite; and a ground station located on earth interconnected to the internet and including means for transmitting RF data to and receiving RF data from, said satellite, said ground station receiving requests for selected web pages from said satellite, connecting to the requested web pages on the internet, and transmitting data concerning the content of the requested web pages to said satellite;

said first processor processing requests for data received from said enhanced terminal request generation means to determine if the memory storage device contains data for the requested web page; and, if so, withdraws such requested web page data from the memory storage device and transmits such requested web page data as said first data stream to said enhanced terminal; and if not, transmits the request for data to said ground station, and upon receipt of said requested web page data from said ground station, retransmits such requested web page data as said second data stream to said enhanced terminal.

11. The communications system according to claim 10 further comprising:

a user terminal located on earth comprising:

a user terminal monitor for displaying web pages;

user terminal receiving means for receiving RF data transmitted from said satellite antenna means;

user terminal processing means for translating said received RF data into web pages for display on said user terminal monitor;

user terminal request generation means for requesting data to enable the display of selected web pages; and user terminal transmission means for transmitting said requests for data to said satellite.

* * * * *